United States Patent
Ochoco

(10) Patent No.: US 7,248,059 B1
(45) Date of Patent: Jul. 24, 2007

(54) LOW POWER SENSOR

(75) Inventor: Jomar G. Ochoco, St. Paul, MN (US)

(73) Assignee: Red Wing Technologies, Inc., Mendota Heights, MN (US)

( * ) Notice: Subject to any disclaimer, the term of this patent is extended or adjusted under 35 U.S.C. 154(b) by 0 days.

(21) Appl. No.: 11/361,872

(22) Filed: Feb. 24, 2006

(51) Int. Cl.
*G01R 27/02* (2006.01)
*G01R 27/28* (2006.01)

(52) U.S. Cl. ................................ 324/609; 324/619

(58) Field of Classification Search ............ 324/609, 324/611, 619
See application file for complete search history.

(56) References Cited

U.S. PATENT DOCUMENTS

| | | | |
|---|---|---|---|
| 4,584,523 A * | 4/1986 | Elabd ........................ | 324/96 |
| 5,777,483 A * | 7/1998 | Bailey ....................... | 324/686 |
| 6,243,007 B1 | 6/2001 | McLaughlin et al. | |
| 6,714,049 B2 * | 3/2004 | Shenai et al. ............... | 326/82 |
| 6,885,365 B1 * | 4/2005 | Kang ......................... | 345/173 |
| 7,023,224 B2 * | 4/2006 | Ansari et al. ............... | 324/691 |
| 7,027,447 B2 * | 4/2006 | Robertson et al. ......... | 370/395.62 |
| 2003/0164767 A1 | 9/2003 | Choi | |
| 2005/0184869 A1 | 8/2005 | Micko | |

* cited by examiner

*Primary Examiner*—Andrew H. Hirshfeld
*Assistant Examiner*—Jeff Natalini
(74) *Attorney, Agent, or Firm*—Brooks, Cameron & Huebsch, PLLC

(57) ABSTRACT

Embodiments of the present disclosure relate to methods, sensors, and systems for low power sensing. One method for low power sensing includes receiving a detection signal from a detector of a sensor to a delay flip flop (DFF). The method includes switching a DFF output state in response to a switching of the detection signal, when the DFF is reset, transmitting an event report signal from the DFF to a processor of the sensor when the DFF output state switches, and maintaining the DFF output in a steady state, when the DFF is not reset.

33 Claims, 4 Drawing Sheets

LOW POWER SENSOR

BACKGROUND OF THE INVENTION

In the field of sensing systems, various sensing devices have been developed including motion sensors, vibration sensors, accelerometers, temperature sensors, and pressure sensors, among others. Such devices can often include a processor, e.g., a microcontroller that is signaled when a sensing event occurs.

Sensing events may be the detection of motion, temperature, pressure, etc. Sensing events can often be detected by logic, associated with the sensing device, as be controlled by the processor to transmit the occurrence of sensing events and other information to a base station receiver, for example.

Many current sensing devices and/or sensor systems are battery powered. The battery life in many sensing systems can vary depending on the power consumption, i.e., depending on how often or how long the sensors are activated, how often the processor is signaled, or "woken up," and/or how often the transmitter is operating, e.g., how often the sensor performs a radio communication, for example, in a system where such sensors communicate wirelessly. Reducing power consumption of battery powered sensors can increase battery life, and thus reduce replacement costs.

Some battery powered sensing devices can conserve power by being maintained in a low power state at times when the sensor elements are inactive, e.g., when the system is in a non-sensing mode. In such sensing devices, the sensing device consumes more power when in a sensing mode, e.g., when the sensor elements are active. Some sensor systems can include a clock that determines when to place the device in an active and/or inactive mode, e.g., at certain times of the day.

Sensing systems have been developed that use sensors within the home to monitor an individual within a dwelling. These systems can include motion sensors, for example, that are connected to a base control system that monitors areas within the dwelling for movement. In such sensing systems, the base control system can be signaled by the motion sensor when movement, e.g., a sensing event, is occurring within a room. For example, the base control system can be notified when an individual is walking around in the room. However, in such systems, continuous signals to indicate the motion of the individual may not be necessary or useful. For instance, if the system is used for monitoring whether or not an individual is active in the particular room, it may not be beneficial for the sensor to consume power by waking the processor and/or sending repeated signals to the base control system while the person is moving around while cleaning the room, for example.

DETAILED DESCRIPTION OF THE INVENTION

Figure 1:
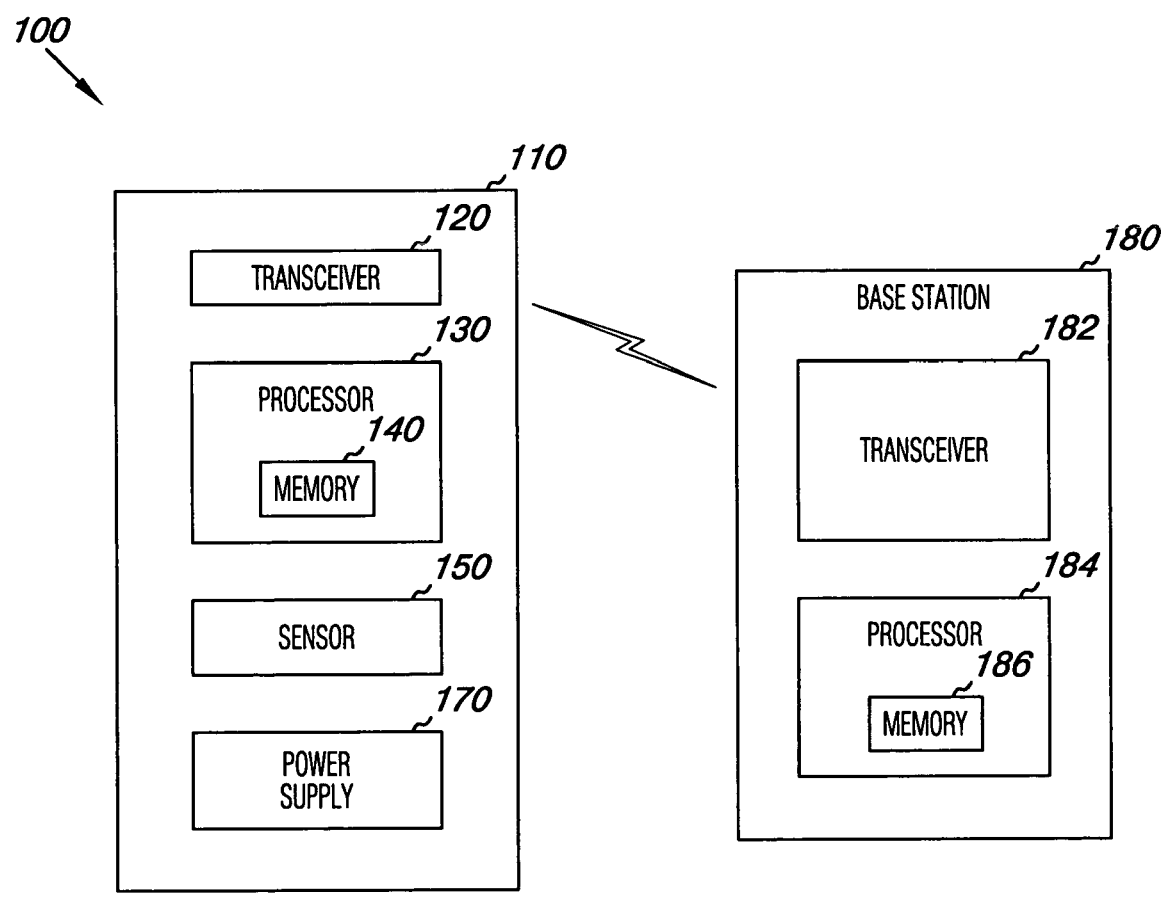
FIG. 1 illustrates a block diagram of a sensing system according to the present disclosure.

In various method, sensor, and system, embodiments of the present disclosure, power can be conserved, for example, by using a low power analog circuit to sense for sensing events, e.g., motion, vibration, pressure, temperature, acceleration, etc., while limiting the frequency with which digital sensor components are used. For instance, it may be useful to employ digital components such as a microcontroller and transmitter, in order to obtain data measurements and/or to communicate detected event occurrences. However, in various applications, the communication of every detected event may not be useful and/or beneficial, and, in some instances it may unnecessarily reduce battery life.

When a sensing device is in a sensing mode, e.g., when the sensor elements are active, it may be beneficial to reduce power consumption by limiting the number of sensing events that are reported and/or the frequency with which the sensing events are reported to a microcontroller, e.g., processor. For example, it may not be useful to wake the processor to digitize an analog signal, each time a sensing event occurs.

For instance, in home monitoring systems, a motion sensor may be used to monitor a person's activity, or lack thereof, in one or more rooms. Current motion sensors may frequently wake the processor and may frequently transmit radio signals or generate alerts when the sensor is sensing motion. Such sensors can consume more power than may be desirable and/or useful in order to determine whether motion is occurring, for example. In such cases, it may be beneficial for the sensing elements to remain active, e.g., to continue to detect motion events, while conserving power, for example, by only waking the processor when communicating a particular motion event.

For instance, the processor may be awakened to communicate a first motion event, e.g., the first time motion occurs in the room. After the first motion occurrence is communicated, the monitoring system may be designed to assume motion within the room until a reporting component of the sensor, e.g., a component used to wake the processor, is enabled.

The sensor component may be enabled after a predetermined time or based on other information. For instance, the sensor component may be enabled based on an emergency signal transmitted from the room and received by the home monitoring system base station. For example, a person may trigger an emergency signal transmission based on a health concern, e.g., the person is having trouble breathing, etc. In such a case, a signal can be transmitted from the base station to the sensor in order to enable the reporting component of the sensor.

In this example, enabling the sensor reporting component can allow the next subsequent motion event, e.g., the next motion activity of the person in the room, to be reported to the processor which can then communicate the event occurrence back to the base station via a transmitter. In this manner, a third party such as an emergency response party, can immediately be made aware of whether motion occurs in the room subsequent to the emergency signal transmission.

In such embodiments, power can be conserved by only waking the processor, e.g., reporting motion, when the sensor reporting component is enabled, despite the fact that the sensor can be detecting motion events even when the reporting component is not enabled.

Embodiments of the present disclosure can also be implemented as part of condition monitoring systems where a low power analog circuit can be used to monitor sensing events while limiting the frequency with which digital sensor components are used. Condition monitoring systems can include various types of sensors such as temperature, pressure, and vibration sensors, among others. For example, some embodiments of the present disclosure can include a vibration sensor in a condition monitoring system that can continuously monitor vibrations for vibration analysis of rotating machines, for instance.

In this example, it can be useful to wake the microcontroller in order to take vibration data measurements, e.g., to take a set number of vibration data measurements or to take data for a period of time. The vibration data measurements can be stored in memory and transmitted to a monitoring system base station, via a radio communication, for analysis.

As in the motion sensor example above, it may not be useful to wake the microcontroller each time a vibration threshold is reached. That is, despite the ability to continuously sense vibration and immediately determine and communicate sensing event occurrences, it may be useful to wake the processor in order to communicate sensing event occurrences that occur after a sensor reporting component of the sensor is enabled. For example, after a first vibration sensing event occurs, it may not be useful to wake the processor upon subsequent vibration sensing events. That is, power can be conserved by preventing subsequent events from being reported to the microcontroller for a period of time, e.g., until a reporting component is enabled. In such embodiments, after the reporting component is enabled, e.g., started, reset, or cleared, the next subsequent sensing event can be communicated.

As described herein, various embodiments of the present disclosure can provide for low power consumption sensing by using a low power analog circuit to sense for events while limiting the use of other components, such as a number of digital components. For example, in some embodiments, power can be conserved by reporting a first sensing event while not reporting subsequent sensing events unless a precondition is met. In such embodiments, the precondition can be the setting/resetting of an event reporting component of a sensor.

In various sensor embodiments, the sensor comprises a detector and logic circuitry that includes a first component having an output capable of changing between at least a first logic state and a second logic state. In some embodiments, the sensor can be a battery powered sensor. The sensor may be a motion sensor, a vibration sensor, a temperature sensor, a pressure sensor, an accelerometer, or an inclinometer, among other sensors. The sensor can, for example, be a pyroelectric infrared (PIR) motion sensor in some embodiments.

In various embodiments, the first component can be a flip flop that can include a data input, a clock input, and a reset input that can receive a signal to return the output to the first logic state. In some embodiments, the data input of the flip flop is maintained at the second logic state.

The logic circuitry can be configured to output the first logic state prior to receiving a first detection signal, to change the output to the second logic state upon receipt of the first detection signal, and to maintain the output at the second logic state upon receipt of a second detection signal if the first component has not been signaled to return the output to the first logic state subsequent to the first detection signal. In some embodiments, the logic circuitry is configured to receive a reset signal and reset the first component to output the first logic state based upon the reset signal.

In various embodiments, the first detection signal and second detection signal are the reaching of a voltage threshold as determined by a second logic circuit corresponding with the reaching of a voltage threshold as determined by a second logic circuit component that includes at least one comparator component. The comparator component can, for example, include a single or multiple comparators. The second logic circuit component can include a comparator that determines the reaching of a positive voltage threshold and a comparator that determines the reaching of a negative voltage threshold. In some embodiments, the output of the second circuit component can be received by the clock input of the flip flop.

In various sensor embodiments, the sensor can include a processor. In such embodiments, the logic circuitry can be configured to transmit a signal to the processor when the output of the first component changes from the first logic state to the second logic state. Also, in various embodiments, the processor transmits a reset signal to be received by the first component to return the output of the first component to the first logic state at a predetermined time.

The present disclosure also includes a number of method embodiments. For example, in some embodiments, the method includes receiving a detection signal from a detector of a sensor to a delay flip flop (DFF). Such method embodiments can also include switching a DFF output state in response to a switching of the detection signal, when the DFF is reset, transmitting an event report signal from the DFF to a processor of the sensor when the DFF output state switches, and maintaining the DFF output in a steady state, after the DFF output state is switched and before the DFF is reset. In various embodiments, the DFF output state can be reset at a predetermined time. The DFF output state can be reset by transmitting a signal from the processor to the DFF, for example.

In various method embodiments, the detection signal from the detector can be received by logic circuitry of the sensor and an output of the logic circuitry can be received by the DFF. Switching the DFF output state can be in response to reaching a voltage threshold determined by the logic circuitry.

Also, in various method embodiments, the method can include using the processor to transmit a signal to a transmitter of the sensor when the DFF output state switches in response to the switching of the detection signal. Some method embodiments include transmitting a radio signal from the transmitter to a radio receiver indicating that the DFF output state switched.

Embodiments can also include employing executable instructions storable on a memory and executable by the processor to prevent switching the DFF output state in response to the switching of the detection signal, when the DFF is reset, while the transmitter is operating. This may reduce the possibility of incorrect signaling and/or signal detection based upon transmitter operations in some embodiments.

FIG. 1 illustrates a block diagram of a sensing system 100 according to the present disclosure. The sensing system 100 includes a sensing device 110 and a base station 180. As shown in FIG. 1, base station 180 can include a processor 184, a memory 186, coupled to the processor 184, and a transceiver 182. The transceiver functionality can be provided, for example, by a radio transceiver or transmitter/receiver components. These components can be used to transmit/receive radio signals to/from sensing device 110.

For example, as will be discussed below, instructions, e.g., computer and/or logic circuit executable instructions, can be stored on the memory 186 and executed by processor 184 to receive signals from device 110 which can indicate that a sensing event of the device has occurred.

As used herein, a "sensing event," or "detecting event," refers to an event, the occurrence of which can be determined by a detector and/or by logic circuitry associated therewith. For example, in the case of a motion sensor, a sensing event may be determined to have occurred when logic circuitry, associated with one or more detectors of the sensor, determines that a threshold, e.g., a voltage threshold, current threshold, or frequency threshold, due to detected motion has been reached.

As illustrated in the embodiment of FIG. 1, sensing device 110 includes a power supply 170. The power supply 170 can include a direct current (DC) source such as one or more batteries. For example, power supply 170 can be a 3.6 Volt Lithium battery or one or more 1.5 Volt AA batteries, among various other batteries having various voltages. The number and type of batteries can depend on the type of sensor. For instance, some sensors may use a power source less than 3 Volts, while other sensors may use a 3.6 Volt, 6 Volt, or 9 Volt power source. For example, in one embodiment of the present disclosure, sensing device 110 is a motion sensor having a 3 Volt power supply comprising two 1.5V AA batteries. Power supply 170 may also include an alternating current (AC) voltage from an outlet through a power cord, or an AC voltage converted to a DC voltage, among other power supply arrangements.

As illustrated in the embodiment of FIG. 1, sensing device 110 also includes a processor 130, a memory 140, and a sensor 150. In various embodiments, processor 130 can be one or more microprocessors and/or microcontrollers. Memory 140 can be located on processor 130 or at another location on device 110. Memory 140 can include RAM, ROM, and/or Flash memory, among other types of memory.

As mentioned above and described in greater detail in connection with FIG. 2, sensor 150 can be a motion sensor, a vibration sensor, a pressure sensor, a temperature sensor, an inclinometer, or an accelerometer, among various other analog or digital type sensors. In some embodiments, sensor 150 can include logic circuitry and/or executable instructions to transmit Boolean logic output to the processor 130 and the base station 180.

As illustrated in the embodiment shown in FIG. 1, sensing device 110 can include a transceiver 120. In various embodiments, transceiver 120 can be a radio transceiver for transmitting/receiving signals to/from a base station, e.g., base station 180. For example, as will be discussed below, executable instructions, e.g., program instructions, can be stored on the memory 140 and executed by processor 130 to transmit signals to a base station, e.g., base station 180, when a sensing event of the device 110 has been reported.

Figure 2:
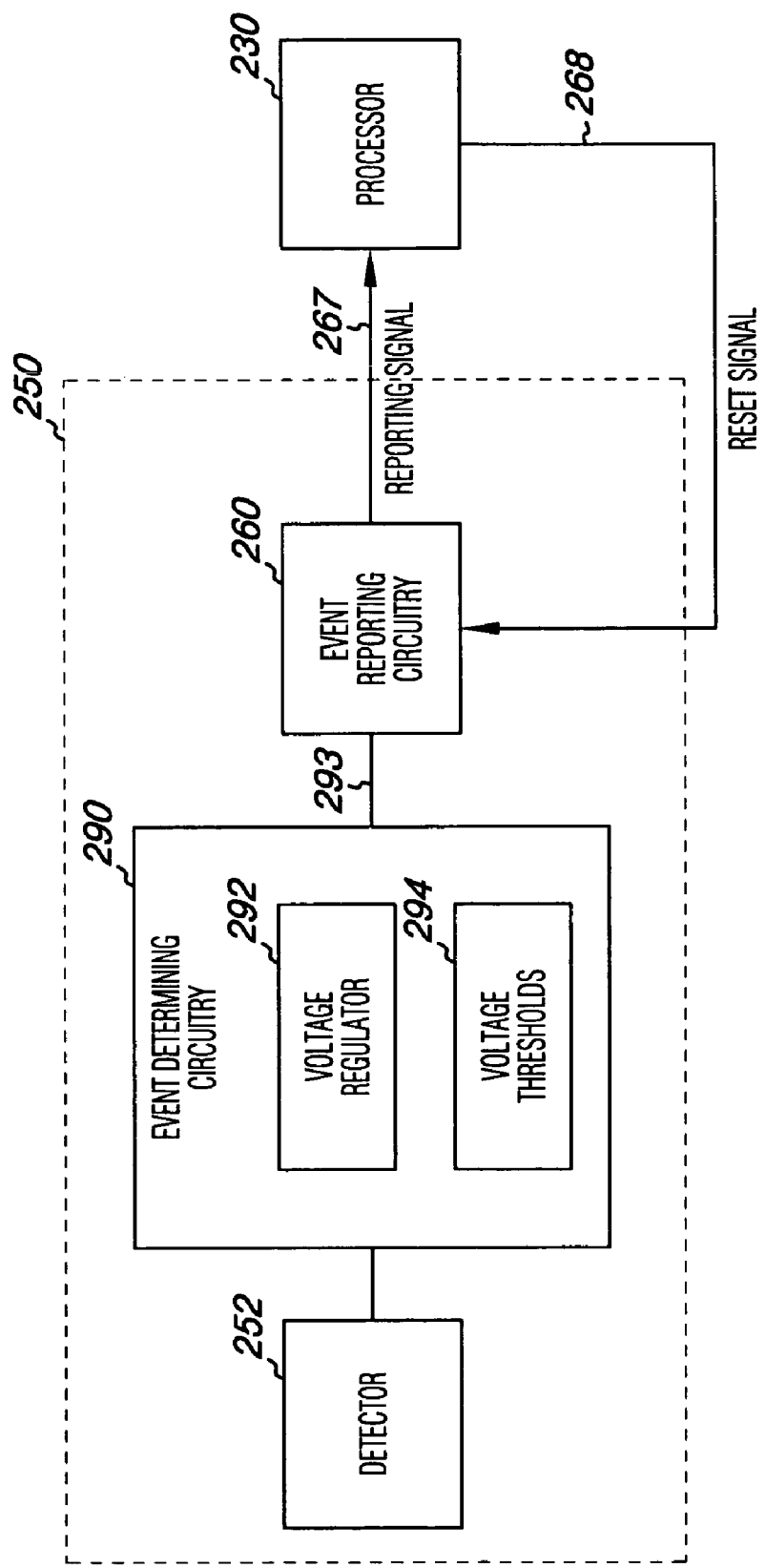
FIG. 2 illustrates a block diagram of a sensor according to the present disclosure.

FIG. 2 illustrates a block diagram of a sensor according to the present disclosure. The embodiment shown in FIG. 2 includes a sensor 250 and a processor 230. In this embodiment, sensor 250 is electrically coupled to processor 230 and is external to sensor 250. Processor 230 can also be included within sensor 250, in various embodiments. As previously mentioned, processor 230 can be a microcontroller and can include memory, e.g., RAM, ROM, etc. Processor 230 can include associated logic circuitry to transmit/receive electrical signals to/from sensor 250 and logic circuitry associated therewith.

In the embodiment illustrated in FIG. 2, sensor 250 includes a detector 252, event determining circuitry 290 that can be used to determine the occurrence of sensing events, and event reporting circuitry 260 that can report the occurrence of sensing events to processor 230. As will be described below, event determining circuitry 290 and event reporting circuitry 260 can include logic circuitry configured to report the occurrence of a first sensing event and configured to not report subsequent sensing event occurrences unless an output of reporting circuitry 260 has been reset, or cleared, prior to a subsequent sensing event occurrence. That is, while the logic circuitry of sensor 250 can be configured to receive an indication of each detected sensing event, the logic circuitry can also be configured to report fewer sensing events than those detected. This may allow power to be conserved in various embodiments.

Detector 252 can include one or more sensing/detecting elements. For example, in a motion sensor, a detector 252 may be a pyroelectric detector comprising a number of sensing elements to measure changes in infrared radiation. The changes measured by the sensing elements of a detector, e.g., detector 252, can, for example, create voltage changes that can be measured by other logic circuitry, e.g., event determining circuitry 290. In various embodiments, the sensing elements of detector 252 and associated logic circuitry may continuously sense for and detect events, e.g., motion, but each detected event occurrence may not be communicated to processor 230.

As mentioned above, a sensing event may be determined to have occurred when an output voltage of a detector, e.g., detector 252, has reached a threshold level. In the embodiment illustrated in FIG. 2, event determining circuitry 290 includes voltage regulator 292 that can be used to provide a stabilized reference voltage and voltage threshold logic circuitry 294 that can be used to provide a threshold voltage to one or more comparators. As will be discussed in further detail below, event determining circuitry 290 can determine when a sensing event occurs and can output a detection signal 293 to indicate a sensing event occurrence. That is, the output of circuitry 290 can change logic states depending on whether or not a sensing event is detected. For example, detection signal 293 can switch between a logic high state, e.g., 1, which can indicate a sensing event occurrence, e.g., a reaching of a voltage threshold, and a logic low state, e.g., 0, which can indicate no sensing event occurrence, e.g., a voltage threshold has not been reached.

As shown in the embodiment illustrated in FIG. 2, the output from event determining circuitry 290, e.g., detection signal 293, can be received by event reporting circuitry 260. That is, circuitry 260 can receive an indication of whether or not circuitry 290 has determined/detected a sensing event. For instance, in various embodiments, circuitry 260 can receive a logic 1 from circuitry 290 when a sensing event occurs and a logic 0 otherwise.

In various embodiments, event reporting circuitry 260 includes logic circuitry configured to transmit and receive signals to and from a processor, e.g., processor 230. As shown in the embodiment illustrated in FIG. 2, a reporting signal 267 can be transmitted to processor 230. In various embodiments of the present disclosure, reporting signal 267 is transmitted to processor 230 when event reporting circuitry 260 determines that a sensing event occurrence is to be reported. In various embodiments, reporting circuitry determines that a sensing event occurrence is to be reported based on a change in the output state of reporting circuitry 260. For example, in some embodiments, reporting signal 267 is only transmitted when the output state of reporting circuitry 260 changes from a logic 0 to a logic 1.

Also, in various embodiments, a reset signal 268 can be received by event reporting circuitry 260. As shown in the embodiment of FIG. 2, reset signal 268 can be transmitted from processor 230. Reset signal 268 can be transmitted to circuitry 260 in order to reset the output of circuitry 260. In various embodiments, reset signal 268 can be transmitted at a predetermined time interval. For example, reset signal 268 could be transmitted at ten second, one minute, ten minute, or thirty minute time intervals, among other intervals. A reset signal could also be sent from a base station, e.g., base station 180 in FIG. 1, to sensor 250 via a radio transceiver.

In various embodiments, event reporting circuitry 260 includes a logic component having an output capable of changing between at least a first logic state and a second logic state, e.g., between a logic 0 and a logic 1. As described below, circuitry 260 can be configured such that the output of the logic component is at the first logic state prior to receiving a first detection signal and such that the output changes to the second logic state upon receipt of the first detection signal. The logic circuitry of the sensor can be configured to maintain the output of circuitry 260 at the second logic state upon receipt of a second detection signal if the first component has not been signaled, e.g., by reset signal 268, to return the output to the first logic state subsequent to the receipt of the first detection signal.

In various embodiments, reporting signal 267 can be transmitted to processor 230 in response to a change in the output of circuitry 260 between the first logic state and the second logic state. In some embodiments, reporting signal 267 is transmitted to processor 230 in response to a change in the output of circuitry 260 from the first logic state to the second logic state. Therefore, a detected sensing event subsequent an initial detected sensing event by determining circuitry 290 may not be reported to processor 230 unless the output of reporting circuitry 260 has been reset (via a reset signal, e.g., reset signal 268) to the first logic state prior to the subsequently detected sensing event.

As mentioned above, sensor detector elements can measure changes in radiation, pressure, frequency, temperature, among many other measurable information types. These measured changes can correspond to detector output voltages that can vary and be measured by logic circuitry of the sensor in order to determine sensing event occurrences, e.g., in order to determine when a motion detector senses motion, etc.

Figure 3:
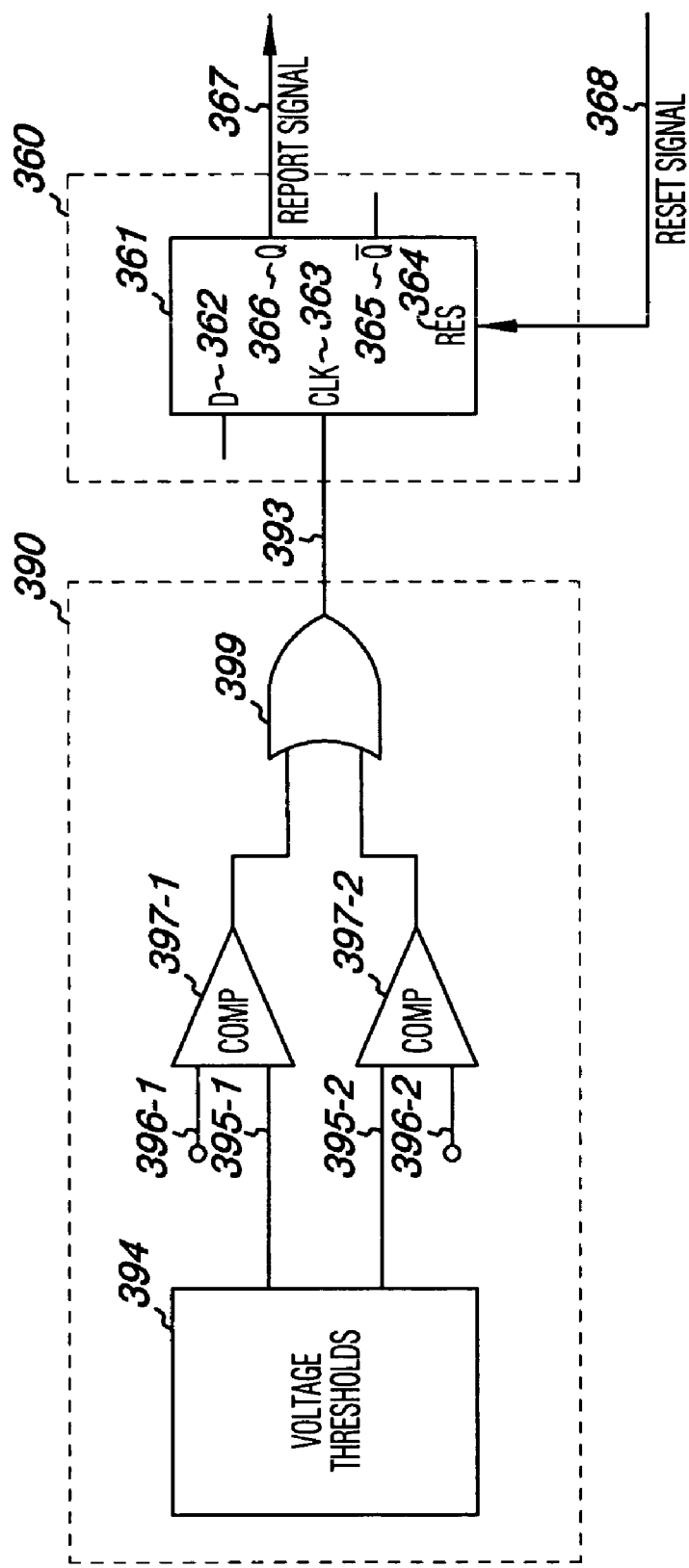
FIG. 3 illustrates a schematic diagram of a sensor embodiment according to the present disclosure.

FIG. 3 illustrates a schematic diagram of a sensor embodiment according to the present disclosure. The embodiment illustrated in FIG. 3 includes an exemplary embodiment of the event determining circuitry 290 and the event reporting circuitry 260 discussed with respect to the sensor embodiment of FIG. 2. That is, the event determining circuitry embodiment 390 can be used to determine when a sensing event occurs, and event reporting circuitry embodiment 360 can be used to determine when a sensing event occurrence is to be reported.

The event determining circuitry embodiment 390 illustrated in FIG. 3 includes voltage threshold logic circuitry 394, two comparators 397-1 and 397-2, and an OR gate 399. As one example, event determining circuitry 390 can be that of a motion sensor. In this example, a sensing event can be a detected motion and can be determined to have occurred when a voltage threshold is reached. The voltage threshold can be a positive or a negative voltage threshold, i.e., a motion sensing event can be determined to have occurred when the detector output voltage rises above or drops below one or more predetermined voltage thresholds.

In this example, comparators 397-1 and 397-2 receive reference voltage thresholds 395-1 and 395-2, respectively, from voltage threshold logic circuitry 394. The voltage thresholds can be predetermined and can depend on the type of sensor. For example, consider a motion sensor in which the detector outputs a voltage that varies from about 1 Volt to 2 Volts when no motion is detected. However, when motion is detected, the detector outputs a voltage that rises above 2 Volts or drops below 1 Volt. In this case, voltage threshold circuitry 394 can be configured to provide a first threshold voltage (a first reference voltage) of 2 Volts to comparator 397-1 and a second threshold voltage (a second reference voltage) of 1 Volt to comparator 397-2. In this example, comparator 397-1 can output a logic 1 (high) when its input voltage 396-1 rises above 2 Volts. Comparator 397-2 can also output a logic 1 when its input voltage 396-2 drops below 1 Volt, indicating that a sensing event has occurred, e.g., that motion is detected.

As shown in the embodiment illustrated in FIG. 3, the outputs of comparators 397-1 and 397-2 are input to an OR gate 399. OR gate 399 has an output 393 that can be considered a detection signal because its output is a logic 1 when motion is detected, e.g., when the detector voltage output in the example above is above 2 Volts or below 1 Volt, and a logic 0 when no motion is detected, e.g., when the detector voltage output in the example above is between 1 Volt and 2 Volts.

Also, as shown in the embodiment illustrated in FIG. 3, detection signal 393 can be received by event reporting circuitry 360. In various embodiments, event reporting circuitry 360 can include a delay flip flop (DFF) 361 that includes various inputs and outputs such as a clock (CLK) input 363, a data (D) input 362, a reset (RES) input 364, an output (Q) 366, and an output (not Q) 365. Embodiments are not limited to use of a delay flip flop. That is, the use of other flip flops such as JK flip flops, Set Reset (SR) flip flops, and toggle type flip flops, among others, are within the scope to the present disclosure.

In various embodiments, detection signal 393 is received by the clock input 363 of the DFF 361, and the event reporting circuitry 360 is configured to output a first logic state prior to receiving a first detection signal 393. That is, the DFF 361 is configured to output a logic 0 prior to the clock input 363 first switching from a logic 0 to a logic 1, e.g., prior to an initial detection signal transition from a low state to a high state due to a sensing event occurrence as determined by event determining circuitry 390. The logic circuitry can be configured to change the output 366 from low to high upon receipt of the first detection signal and to maintain the output 366 at the logic high state upon receipt of a second detection signal 393 if the DFF 361 has not been signaled to return the output 366 to a logic low state subsequent to receiving the first detection signal 393.

To accomplish this, in various embodiments, the data input 362 can be maintained at a logic high state. For example, the output (Q) 366 of the DFF 361 follows the data input 362 (which in some embodiments can be maintained at a logic high state) such that the output 366 switches to a logic high state whenever the clock input 363 transitions from a logic low state to a logic high state, e.g., whenever OR gate 399 outputs a logic high. However, once the DFF output 366 switches to a logic high state the output state remains high, despite changes of the clock input 363 (i.e., despite subsequent sensing event occurrences), unless the reset input 364 has been signaled prior to the subsequent sensing event occurrence. That is, subsequent high clock pulses (sensing event occurrences after the first) do not affect the DFF output state 366 unless the output has been returned to a logic low state ("reset") after the first sensing event occurrence, in such embodiments. As shown in the embodiment illustrated in FIG. 3, a reset signal 368 can be received to reset input 364. Reset signal can be transmitted to reset input 364 from a microcontroller or other processing component.

In various embodiments of the present disclosure, event reporting circuitry 360 can be configured to transmit a reporting signal 367 when the DFF output 366 switches from a logic low state to a logic high state. As described herein, a reporting signal is not transmitted whenever a sensing event occurs, e.g., whenever detection signal 393 switches from low to high. As mentioned above in connection with FIGS. 1 and 2, reporting signals 367 can be transmitted to a processor, which can then send a corresponding signal to a transceiver of the sensor and/or of a base station.

Power is consumed each time a processor receives a reporting signal, each time the processor transmits a corresponding signal to a transceiver, and each time a radio communication occurs between a sensor and a base station. Therefore, it may be beneficial to reduce power consumption of batteries and other power sources by reducing the number of times that event report signals are transmitted, e.g., at times when the waking of the processor each time a sensing event occurs may not be useful and/or desirable.

For instance, consider the example of a battery powered motion sensor for detecting motion in a room of a home or office which includes logic circuitry as illustrated in the embodiment of FIG. 3. According to various embodiments of the present disclosure, a first report signal 367 could be transmitted to a processor the first time an object or person moves into the room or moves while in the room during a particular time period. The processor could then execute instructions to initiate a communication from the sensor to a base station or other device capable of receiving the signal in order to indicate that a motion event has occurred in the room.

After the processor has received the first reporting signal 367, the object may continue moving, e.g., a person may be walking around in the room. In this case, repeated sensing events would be occurring and could be determined by event determining circuitry 390. However, transmitting repeated reporting signals may not be useful, in many instances. For example, in some instances, one is concerned about whether the person is in the room and not whether the person is continuously moving within the room. In such cases, embodiments of the present disclosure could transmit the first reporting signal 367 to indicate motion, and then not report another motion event for a particular time period. Motion within the room may be assumed for a time interval, e.g., until the output of DFF 361 is reset, thereby enabling the device to transition from a low to high logic state again. In various embodiments, a processor or microcontroller of the sensor can initiate the transmission of the reset signal 368 to the DFF to reset the output at a predetermined time interval.

In this motion sensor example, resetting the DFF output to a logic low state enables the sensor such that a next subsequent sensing event occurrence will result in a reporting signal transmission to the microcontroller. That is, the next clock input 363 transition to a high logic state will wake the processor and can initiate a signal transmission. In this manner, embodiments of the present disclosure may continuously be measuring sensing events, but may conserve power by waking the processor in certain circumstances, e.g., when an event is detected after the DFF has been cleared. In the example above, one can check whether motion is occurring in the room by resetting the DFF output and waiting for a reporting signal 367. The lack of a reporting signal transmission after a reset of the DFF output may indicate that the person is no longer in the room or that the person is in the room but not moving.

Figure 4:
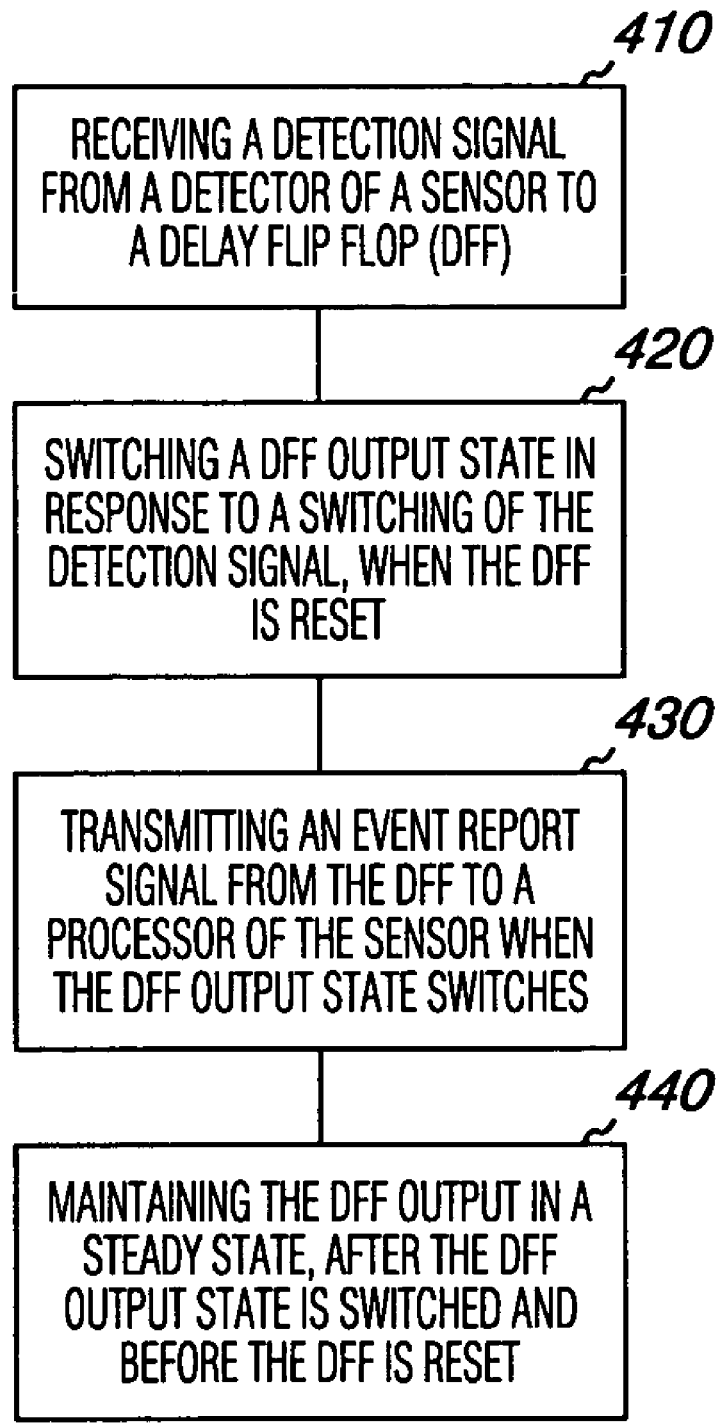
FIG. 4 illustrates a method for low power sensing according to an embodiment of the present disclosure.

FIG. 4 illustrates a method for low power sensing according to an embodiment of the present disclosure. As shown at block 410, the method includes receiving a detection signal from a detector of a sensor to a delay flip flop (DFF). The DFF can be a clocked DFF. As described above in connection with FIGS. 2 and 3, the detection signal can be received by a logic circuit and an output of the logic circuit can be received by the DFF. In various method embodiments, the receiving can include receiving the detection signal from a detector of a battery powered sensor.

As shown at block 420, the method includes switching a DFF output state in response to a switching of the detection signal, when the DFF is reset. The switching of the detection signal can be in response to reaching a voltage threshold as determined by the logic circuit. In various embodiments, the method includes resetting the DFF output state at a particular time. This time can be predetermined and can be stored in memory or performed by logic circuitry, for example.

As shown at block 430, the method includes transmitting an event report signal from the DFF to a processor of the sensor when the DFF output state switches, and as shown at block 440, the method includes maintaining the DFF output in a steady state, after the DFF output state is switched and before the DFF is reset. The resetting can be the result of transmitting a signal from the processor to the reset input of the DFF.

In various embodiments, the DFF can act as an interface between a low power analog circuit, e.g., event determining circuit 390, and a high power digital circuit that can include a microcontroller, e.g., processor 230, and other digital components and/or circuitry. The low power circuit can include a detector and/or other event determining circuitry as described in connection with FIG. 2, as well as other analog circuitry. As mentioned above, sensing devices can consume more power when the digital circuit, e.g., the microcontroller, wakes up.

In various embodiments, the method can further include transmitting a signal to a transmitter of the sensor by using the processor, when the DFF output state switches in response to the switching of the detection signal. Various methods can include transmitting a radio signal from the transmitter to a radio receiver indicating that the DFF output state has switched.

The method can also include employing executable instructions storable on a memory and executable by the processor to prevent switching the DFF output state in response to the switching of the detection signal, when the DFF is reset, while the transmitter is operating. Operation of the transmitter, e.g., for radio communication with a radio receiver, may cause the logic circuitry of the sensor to determine false detection signals that may then be received to the DFF. Therefore, to avoid transmitting an event report signal from the DFF to the processor due to a false detection event, some embodiments use instructions that can be executed by the processor to ignore detection signals from the detector of the sensor when the transmitter is in operation, e.g., transmitting a radio signal.

Although specific embodiments have been illustrated and described herein, those of ordinary skill in the art will appreciate that an arrangement calculated to achieve the same techniques can be substituted for the specific embodiments shown. As one of ordinary skill in the art will appreciate upon reading this disclosure, various embodiments of the present disclosure can be performed in one or more devices, device types, and system environments including networked environments.

Combination of the above embodiments, and other embodiments not specifically described herein will be apparent to those of skill in the art upon reviewing the above description. The scope of the various embodiments of the present disclosure includes other applications in which the above structures and methods can be used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for low power sensing, comprising:
receiving a first detection signal from a detector of a sensor to a delay flip flop (DFF);
switching a DFF output state in response to the first detection signal;
transmitting an event report signal from the DFF to a processor of the sensor when the DFF output state switches;
receiving a second detection signal from a detector of a sensor to the DFF; and
maintaining the DFF output in a steady state after the DFF output state is switched in response to the first detection signal such that an event report signal is not transmitted from the DFF to the processor based on the second detection signal, wherein the first and the second detection signals are received before the DFF is reset.

2. The method of claim 1, wherein receiving includes receiving the first detection signal from the detector of the sensor to a logic circuit and receiving an output of the logic circuit to the DFF.

3. The method of claim 2, wherein switching the DFF output state in response to the first detection signal includes switching the DFF output state in response to reaching a voltage threshold determined by the logic circuit.

4. The method of claim 1, wherein receiving the first detection signal includes receiving the first detection signal of the sensor to the DFF of a battery powered sensor.

5. The method of claim 1, wherein the method includes resetting the DFF output state at a predetermined time.

6. The method of claim 5, wherein the method includes resetting the DFF output state at the predetermined time by transmitting a signal from the processor to a reset input of the DFF.

7. The method of claim 1, wherein the method includes transmitting a signal to a transmitter of the sensor by using the processor, when the DFF output state switches in response to the first detection signal.

8. The method of claim 7, wherein the method includes transmitting a radio signal from the transmitter to a radio receiver indicating that the DFF output state has switched.

9. The method of claim 8, wherein the method includes employing executable instructions storable on a memory and executable by the processor to prevent switching the DFF output state in response to the first detection signal, while the transmitter is operating.

10. A sensor, comprising:
a detector; and
logic circuitry, including a first component having an output coupled to a processor, the output capable of changing between at least a first logic state and a second logic state, the logic circuitry configured to:
output the first logic state prior to receiving a first detection signal from the detector;
change the output to the second logic state upon receipt of the first detection signal, the output change signaling the processor of the first detection signal; and
receive a second detection signal from the detector while maintaining the output at the second logic state such that the processor is not signaled of the second detection signal, wherein the first and the second detection signals are received prior to the first component receiving a reset signal.

11. The sensor of claim 10, wherein the logic circuitry is configured to reset the first component to output the first logic state based upon the reset signal.

12. The sensor of claim 10, wherein the first component is a flip flop that includes:
a data input;
a clock input; and
a reset input, wherein the reset input can receive a signal to return the output to the first logic state.

13. The sensor of claim 12, wherein the logic circuitry is configured to maintain the data input of the flip flop at the second logic state.

14. The sensor of claim 13, wherein the first detection signal and second detection signal correspond with the reaching of a voltage threshold as determined by a second logic circuitry component that includes at least one comparator.

15. The sensor of claim 14, wherein the second logic circuitry component includes a comparator that determines the reaching of a positive voltage threshold and a comparator that determines the reaching of a negative voltage threshold.

16. The sensor of claim 14, wherein an output of the second component is received by the clock input of the flip flop.

17. The sensor of claim 16, wherein the sensor is selected from the group including:
a motion sensor;
a vibration sensor;
a pressure sensor;
a temperature sensor;
an accelerometer; and
an inclinometer.

18. The sensor of claim 16, wherein the sensor is a pyroelectric infrared (PIR) sensor.

19. The sensor of claim 10, wherein the logic circuitry is configured to transmit a signal to the processor when the output of the first component changes from the first logic state to the second logic state.

20. The sensor of claim 19, wherein the processor transmits the reset signal to the first component to return the output of the first component to the first logic state at a predetermined time interval.

21. The sensor of claim 10, wherein the sensor is battery operated.

22. A sensing system, comprising:
 a sensing device including:
  a processor;
  a memory coupled to the processor; and
  a sensor coupled to the processor, the sensor including:
   a detector;
   a delay flip flop (DFF); and
   logic circuitry configured to:
    determine one or more sensing events of the detector;
    transmit a signal to an input of the DFF when the one or more sensing events occur; and
    signal the processor when an output of the DFF switches from a first logic state to a second logic state, wherein a first sensing event switches the output of the DFF from the first to the second logic state, and wherein at least one sensing event subsequent to the first sensing event occurs prior to the DFF receiving a reset signal such that the at least one subsequent sensing event does not switch the output of the DFF; and
 a base station including:
  a transceiver;
  a processor coupled to the transceiver;
  a memory coupled to the processor; and
  wherein the transceiver receives a signal from the sensing device indicating one or more sensing events have been determined.

23. The system of claim 22, wherein the sensing device includes a radio transceiver to transmit a radio signal to the transceiver of the base station when the DFF output switches from the first logic state to the second logic state.

24. The system of claim 23, wherein the sensing device includes executable instructions storable in the memory and executable by the processor to prevent the DFF output from switching from the first logic state to the second logic state when the transceiver is operating.

25. The system of claim 22, wherein the sensing device includes logic circuitry configured to signal a reset input of the DFF to return the output of the DFF to the first logic state.

26. The system of claim 25, wherein the base station includes executable instructions storable on its memory and executable by its processor to transmit a reset signal to the sensing device to return the output of the DFF to the first logic state.

27. The system of claim 22, wherein the output of the DFF is maintained at the second logic state after switching from the first logic state until the DFF is reset.

28. The system of claim 22, wherein the logic circuitry configured to determine the one or more sensing events includes one or more comparators to determine when one or more voltage thresholds are reached.

29. The system of claim 28, wherein the one or more comparators to determine when the one or more voltage thresholds are reached include:
 a first comparator to determine when an upper voltage threshold of the sensor is reached; and
 a second comparator to determine when a lower voltage threshold of the sensor is reached.

30. The system of claim 22, wherein the sensing device includes a number of detectors, and wherein the logic circuitry is configured to determine one or more sensing events of each of the detectors.

31. The system of claim 22, wherein the sensing device is battery powered.

32. The system of claim 22, wherein the logic circuitry is configured to maintain a data input of the DFF at the second logic state.

33. The system of claim 31, wherein the logic circuitry configured to transmit the signal to the input of the DFF when the one or more sensing events occur is configured to transmit the signal to a clock input of the DFF.

* * * * *